(12) United States Patent
Blankenburg et al.

(10) Patent No.: US 12,195,598 B2
(45) Date of Patent: Jan. 14, 2025

(54) RADIATION CROSSLINKING BOOSTERS FOR ALIPHATIC POLYAMIDES

(71) Applicant: THUERINGISCHES INSTITUT FUER TEXTIL—UND KUNSTSTOFF-FORSCHUNG E.V., Rudolstadt (DE)

(72) Inventors: Lars Blankenburg, Kahla (DE); Henning Austmann, Rudolstadt (DE)

(73) Assignee: Thüringisches Institute für Textile—und Kunstostoff-Forschung e. V., Rudolstadt (DE)

( * ) Notice: Subject to any disclaimer, the term of this patent is extended or adjusted under 35 U.S.C. 154(b) by 174 days.

(21) Appl. No.: 17/974,615

(22) Filed: Oct. 27, 2022

(65) Prior Publication Data
US 2023/0129411 A1 Apr. 27, 2023

(30) Foreign Application Priority Data
Oct. 27, 2021 (DE) ..................... 10 2021 127 946.1

(51) Int. Cl.
C08J 3/28 (2006.01)
C08J 3/24 (2006.01)
C08K 5/20 (2006.01)

(52) U.S. Cl.
CPC . *C08J 3/28* (2013.01); *C08J 3/24* (2013.01); *C08K 5/20* (2013.01); *C08J 2377/02* (2013.01); *C08J 2377/06* (2013.01)

(58) Field of Classification Search
None
See application file for complete search history.

(56) References Cited

U.S. PATENT DOCUMENTS 4,391,537 A 7/1983 Prest et al.

FOREIGN PATENT DOCUMENTS

| EP | 1 174 026 A2 | 1/2002 |
| EP | 2 380 928 A2 | 10/2011 |
| EP | 2 552 497 B1 | 1/2021 |
| JP | 2005 112925 A | 4/2005 |

OTHER PUBLICATIONS

Biçak et al., "Synthesis of N,N'-diallylmalonamide and its copolymer gels with acrylic acid and acrylamide," Angew. Makromol. Chem. 255 (1998) pp. 13-16.
Coufourier et al., "Hydrogenation of $CO_2$, Hydrogenocarbonate and Carbonate to Formate in Water using Phosphine Free Bifunctional Iron Complexes", ACS catalysis, (2020) 10, 3, pp. 2108-2116.
Iacobucci et al., "The First MS-Cleavable, Photo-Thiol-Reactive Cross-Linker for Protein Structural Studies" J. Am. Soc. Mass Spectrom. (2019) 30, 1, pp. 139-148.
European Search Report for corresponding EP 22 203 915.8.

*Primary Examiner* — Sanza L. McClendon
(74) *Attorney, Agent, or Firm* — ProPat, LLC; Cathy Moore

(57) ABSTRACT

Radiation cross-linking boosters for polyamides that include compounds which are solid at room temperature, migration stable, and thermally stable for the electron and gamma irradiation of components made of polyamide. Method of using radiation cross-linked polyamides in novel fields of application, for example, in food technology or to enable novel processing methods, for example extrusion by the use of polyallyl amides.

20 Claims, 1 Drawing Sheet

RADIATION CROSSLINKING BOOSTERS FOR ALIPHATIC POLYAMIDES

CROSS-REFERENCE TO RELATED APPLICATIONS

Figure 1:
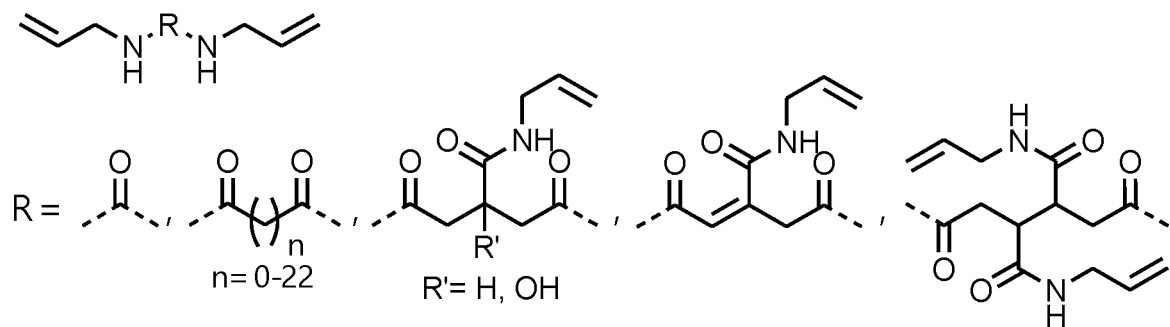

This application claims priority to German Patent Application No. 10 2021 127 946.1 filed Oct. 27, 2021, which is hereby incorporated herein by reference in its entirety.

FIELD OF THE INVENTION

The invention describes radiation cross-linking boosters for polyamides. The radiation cross-linking boosters used in the invention are compounds that are solid at room temperature, migration stable, and thermally stable for the electron and gamma irradiation of components made of polyamide. In this way, using radiation-cross-linked polyamides in novel fields of application is made possible, for example, in food technology or to enable novel processing methods, for example, extrusion. The object is achieved by the use of polyallyl amides.

BACKGROUND OF THE INVENTION

Due to the irradiation of plastic components using electron beams or gamma beams, fractures of polymer chains and lateral cross-linking between polymer chains, so-called gelling, occur. If the effect of the lateral cross-linking predominates, the short-term usage temperature, the heat resistance, the surface hardness, and the solvent resistance of the plastic component increase. In the case of polyamides, the moisture absorption is additionally reduced by lateral cross-linking.

In order that the effect of the lateral cross-linking predominates, the use of additives, so-called radiation cross-linking boosters, also referred to in the technical literature as polyfunctional monomers (PFM), is required. Many of the additives used up to this point have been health-harmful liquids, have low vapor pressures, are sensitive to hydrolysis, or migrate easily out of the non-irradiated compounds and components.

A method for treating, in particular for hardening components based on polyamide 66 is disclosed in U.S. Pat. No. 4,391,537. For this purpose, the component is immersed for a long time in a solution of N,N-diallyl acrylamide in aqueous methanol. It is then irradiated in a nitrogen atmosphere using electron beams having an energy of at least 200,000 eV, preferably more than 500,000 eV.

The following additives are used as radiation cross-linking boosters for cross-linking greatly varying plastics, or are described in the literature:

Tetraethylene glycol diacrylate, tetraethylene glycol dimethacrylate, diallyl adipate, diallyl melanine dipropenyl triamine triazine, trishydroxyethyl isocyanuric acrylate, trimethallyl isocyanurate, triallyl cyanurate, triethylene glycol dimethacrylate, trimethylol propane propoxylate triacrylate, butylene glycol dimethacrylate, ethylene dimethacrylate, triallyl phosphate, polyethylene glycol dimethacrylate, trimethylol propane-ethoxylate-triacrylate, pentaerythritol triacrylate, pentaerythritol tetraacrylate, triallyl trimellitate, hexane diol dimethacrylate, diallyl phthalate, bisphenol A-dimethacrylate ester, trimethyl propane trimethacrylate, hexane glycol diacrylate, diethylene glycol dimethacrylate, pentaerythritol-monohydroxy-pentaacrylate, neopentyl glycol diacrylate, trimethylol propane-propane-trimethacrylate, divinyl benzene, tripropylene glycol diacrylate, diallyl maleate.

The technical world has presumed up to this point that at least trifunctional radiation cross-linking boosters such as triallyl isocyanurate or trimethallyl isocyanurate would have to be used for polyamides.

For the polyamides 6 and 66 exclusively liquid triallyl isocyanurate (TAIC) is used as a cross-linking booster. The more thermally stable and also liquid trimethallyl isocyanurate (TMAIC) is hardly used, since its reactivity is significantly lower.

The processing of additives that are liquid at room temperature such as triallyl isocyanurate or trimethallyl isocyanurate places special demands on the available facility technology, such as liquid metering and strong extraction to remove volatile substances from the respiratory air. Alternatively to the liquid metering, liquid additives can be absorbed on a porous carrier, for example, Accurel XP 700, with a high level of work effort.

TRIC has a melting point of 25° C. and a boiling point of 311° C. (101.3 kPa). In thermogravimetric analysis (TGA), it has a mass loss of 2% at 149° C.

Final applications for radiation-cross-linked polyamides are electric plugs produced in injection moulding. In the finished plugs, electron irradiation causes an increase of the short-term usage temperature and thus permits soldering with high-melting-point, lead-free solders.

Food contact applications and extrusion applications such as pipe extrusion, filament extrusion, and FFF 3D printing cannot be developed due to the high volatility of the additives, the large surfaces in the processes, and the long dwell times.

For food contact applications such as spatulas, pot lid knobs, or frying pan handles, polyether sulfone has been used up to this point. This material is significantly more expensive at approximately 16 €/kg than polyamide 6, which costs approximately 3 €/kg. Polyamide 12 is used for the pipe extrusion of plastic lines. Solid, thermally stable cross-linking boosters have the potential of making these lines thinner. Polyamide 12 or polyamide 6/66 is used for the FFF 3D printing of polyamides.

SUMMARY OF ADVANTAGEOUS EMBODIMENTS OF THE INVENTION

The object of the invention is to overcome the disadvantages of the radiation cross-linking boosters known from the prior art for polyamides and to develop cross-linking boosters, which are solid at room temperature, migration stable, and thermally stable, for the electron and gamma irradiation of components made of polyamide. In this way, it is made possible to use radiation-cross-linked polyamides in novel fields of application, for example in food technology or to make novel processing methods possible, for example extrusion. The object is achieved by the use of polyallyl amides of structure A or diallyl amides of structure B. The number of the allyl functionalities in compounds of structure A is 2, 3, or 4. Compounds of structure A may generally be represented by the following formula (as shown in FIG. 1):

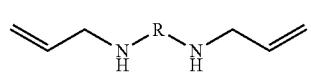

Structure A

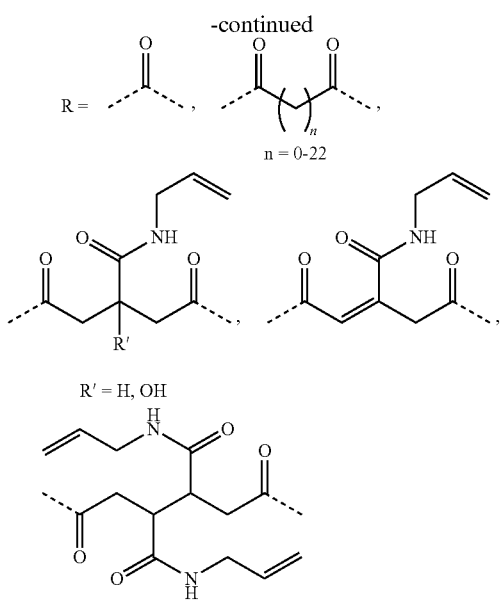

R' = H, OH

In this case, these are especially diallyl amides of carbonic, oxalic, malonic, succinic, glutaric, and adipic acids. Triallyl amides of citric, aconitic, and propane tricarboxylic acid and the tetrallyl amide of butane tetracarboxylic acid. The term "polyallyl amides" is to be understood in the context of the present invention as compounds which contain at least one amide group and two or more allyl groups.

Figure 2:
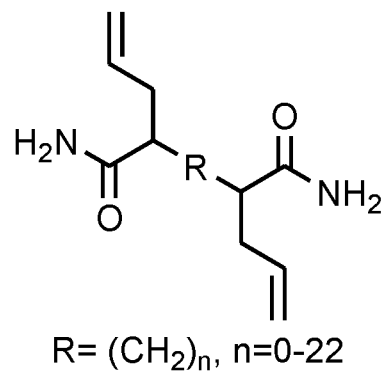

Alternatively, compounds of structure B can be used, in which the amide group and the allyl group are present separately from one another in the structure (as shown in FIG. 2):

Structure B

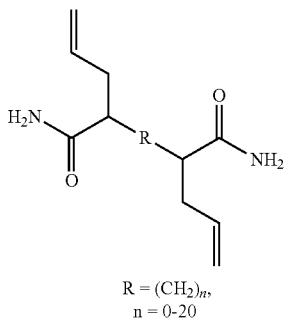

R = (CH₂)ₙ,
n = 0-20

BRIEF DESCRIPTON OF THE FIGURES

FIG. 1 is the chemical formula for inventive compounds of Structure A; and
FIG. 2 is the chemical formula for inventive compounds of Structure B.

DETAILED DESCRIPTION OF ADVANTAGEOUS EMBODIMENTS OF THE INVENTION

All compounds according to the invention are high-melting-point solids which are easy to meter. Additives in polyamides which contain primary and/or secondary amide bonds do not migrate out of the material. The suppression of the migration is based on the formation of strong hydrogen bonds between amide hydrogen atoms of the amide function of the additive and the carbonyl groups of the polyamide plastic.

To suppress the migration out of both the nonirradiated and also the irradiated polyamide object, the compounds according to the invention contain primary and/or secondary amide groups. The di-, tri-, and tetraallyl amides each bear at least one hydrogen atom capable of forming hydrogen bonds on each nitrogen atom of the amide groups.

The technical world has presumed up to this point that at least trifunctional radiation cross-linking boosters such as triallyl isocyanurate or trimethallyl isocyanurate would have to be used for polyamides. It has surprisingly been found that diallyl amides are also outstandingly suitable as radiation cross-linking boosters. The allyl group can be bound here to the amide group, as in structure A, or to a carbon atom of the polycarboxylic acid framework, as in structure B. The following compounds have proven to be particularly suitable: N,N'-diallyl urea, N,N'-diallyl oxalamide, N,N'-diallyl malonamide, 2,2-diallyl malonamide, N,N'-diallyl succinamide, N,N'-diallyl adipamide, 2,5-diallyl adipamide, N,N',N''-triallyl citric acid triamide, N,N',N''-triallyl propanic acid triamide, N,N',N''-triallyl aconitic acid triamide, and N,N',N'',N'''-tetraallyl butane tetracarboxamide, N,N'-diallyl dodecane diamide, N,N'-diallyl octadecane diamide. The free hydroxy group of N,N',N''-triallyl citric acid triamide can be provided in free or etherified or esterified form. A mixture of two, three, or more of the above-mentioned radiation cross-linking boosters can also be used.

With the exception of the less thermally stable N,N'-diallyl oxalamide, all compounds are suitable to be incorporated in polyamide 6, polyamide 6/66, and polyamide 12, and partially in polyamide 66. Both irradiated and also nonirradiated granulated material samples did not display sweating of additives upon multiple years of storage, by which the migration stability of the additives is confirmed.

The additives have sufficiently high melting points, so that blocking of the additives cannot occur in the intake of the compound extruder. The melting point of N,N'-diallyl urea is thus at 98° C., N,N'-diallyl oxalamide at 158° C., N,N'-diallyl malonamide at 147° C., 2,2-diallyl malonamide at 201° C., N,N'-diallyl succinamide at 189° C., N,N'-diallyl adipamide at 160° C., and of N,N',N''-triallyl citric acid triamide at 98° C.

The proportion of the at least one radiation cross-linking booster is generally 1.0 to 11.0 wt. %, preferably 2.0 to 6.0 wt. %, particularly preferably 3.0 to 5.0 wt. %, each in relation to the weight of the polyamide. The radiation cross-linking boosters are mixed with the polyamide before it is processed to form moulded bodies.

Due to the radiation cross-linking boosters, compounds that can be radiation cross-linked can be used in extrusion applications, such as pipe, filament, and film extrusion, in 3D printing, and in food contact applications.

Weak points of the FFF 3D printing are the thermal warping and the sometimes poor layer adhesion. Therefore, polyamides having a low level of crystallinity such as polyamide 6/66 or polyamide 12 or polyethylenterephthalate co-polymerized with cyclohexane dimethanol (PETG) are used most. These materials are inferior to polyamide 6 with respect to their usage temperatures, however. In components produced in the fused deposition method from suitable compounds, the irradiation causes an increase of the layer adhesion. The layer adhesion of polyamide 6 is very poor due to its high crystallization speed. Layer adhesion values for other materials which were processed in the same printing system are between 25-50 MPa, for PA6 this value is approximately 5-6 MPa. The irradiation increased the layer adhesion by up to 23%.

If, for example, with polyamide 6 the heat distortion resistance is increased by irradiation from 130° C. to 209° C., this material may be used as a replacement for high-performance plastics.

An increased gel content causes a lower water absorption and a higher resistance to organic solvents such as benzyl alcohol or m-cresol in cross-linked polyamides. The glass transition temperature of cross-linked polyamides increases with the gel content and is a thermal indicator of how good the cross-linking result is.

In partially crystalline materials such as polyamide 6, the proportion of the interfaces between amorphous and crystalline regions increases when nucleation agent is added. Since the radiation cross-linking only takes place in the amorphous regions and the boundary regions, the gel content increases due to the addition of nucleation agents. This effect is well known for the known system TAIC/PA6. The cross-linking boosters according to the invention also display this effect.

Phosphites such as IRGAFOS® 168 or WESTON® 618f contribute to the stabilization during the irradiation under air oxygen, in contrast, phenolic antioxidants such as IRGANOX® 1098 prevent the cross-linking. It was possible to show this in experiments.

In contrast to peroxidic cross-linking, aromatic ring systems have a negative influence on the cross-linking result, since they absorb radiation and thus reduce the radiation dose. The gel content of cross-linked samples which contain Irgafos 168 is therefore somewhat less. Ideally, aliphatic phosphites such as WESTON® 618f are used.

For the extrusion of pipes and filaments for 3D printing from polyamide 12, the more thermally stable additives N,N'-diallyl succinamide and N,N'-diallyl adipamide are particularly suitable. Diallyl urea, which can be produced more cost-effectively, is very well suitable for injection moulding applications made of polyamide 6, for example, electric plugs.

For frying pan handles made of cross-linked polyamide 6, compounds which result in components having particularly high heat distortion resistance are suitable, in particular N,N',N'''-triallyl citric acid triamide and N,N',N'',N'''-tetraallyl tetracarboxamide.

The following examples are used to explain the invention. Percentages are to be understood therein as weight percentages if not indicated otherwise or obvious from the context.

Determination of the Gel Content

The determination of the cross-linked proportion of the samples was carried out similarly to DIN EN ISO 10147: 2013 using the solvents formic acid (GA) and benzyl alcohol (GB).

Production of Cross-Linking Boosters

The synthesis of N,N'-diallyl urea (DAU) was carried out using allyl amine and carbonyl diimidazole according to the directions of C. Iacobucci, C. Piotrowski, A. Rehkamp, C. H. Ihling, C. Hage, A. Sinz, "The First MS-Cleavable, Photo-Thiol-Reactive Cross-Linker for Protein Structural Studies" J. Am. Soc. Mass Spectrom. 2019, 30, 1, 139-148 (Supplementary Information). The synthesis of N,N'-diallyl oxalamide (DAO) was carried out from diethyl oxalate and allyl amine according to the directions of S. Coufourier, Q. G. Gaillard, J.-F. Lohier, A. Poater, S. Gaillard, J.-L. Renaud, "Hydrogenation of CO2, Hydrogenocarbonate and Carbonate to Formate in Water using Phosphine Free Bifunctional Iron Complexes", ACS catalysis, 2020, 10, 3, 2108-2116 (Supporting Information S.6). The synthesis of N,N'-diallyl malonamide (DAM) was carried out from diethyl malonate and allyl amine adapted according to N. Biçak, S. Karaoğllan, B. F. Şenkal, Angew. Makromol. Chem. 255 (1998) 13-16. The synthesis of 2,2-diallyl malonamide (DAM*) is multistage. First, diethyl diallyl malonate is saponified in alkaline form to form the free acid, Klaus Schwetlick et al.: Organikum. $22^{nd}$ edition. Wiley-VCH, Weinheim 2009, page 489 et seq. In a second step, the acid is converted into its chloride, this is carried out using thionyl chloride according to Klaus Schwetlick et al.: Organikum. $22^{nd}$ edition. Wiley-VCH, Weinheim 2009, page 498 et seq. In the last step, the acid chloride is reacted with ammonia to form 2,2-diallyl malonamide, Klaus Schwetlick et al.: Organikum. $22^{nd}$ edition. Wiley-VCH, Weinheim 2009, page 484 et seq. The synthesis of N,N'-diallyl succinimide (DAS) was carried out from diethyl succinate and allyl amine similarly adapted according to N. Biçcak, S. Karaoğlan, B. F. Şenkal, Angew. Makromol. Chem. 255 (1998) 13-16. The synthesis of N,N',N''-triallyl citric acid triamide (TACT) was carried out according to modified instructions from EP 1 174 026 A2 (whose United States equivalent is U.S. Pat. No. 6,399,088 which is hereby incorporated herein in its entirety). Triethyl citrate was reacted here with allyl amine.

Materials Used

All materials used have in Europe a food contact authorization (list in appendix I EU 10/2011), except for WESTON® 618F, this is not yet completely authorized.

Polymers

Polyamide 6

ALPHALON™ 33 from Grupa Azoty Tarnow was used. The polyamide did not contain any additives or any acid regulators. The relative viscosity (ISO 307) was 3.3 (1% in 96% $H_2SO_4$), the melting point was (ISO 3146) 220° C.

Polyamide 6/66

For comparative examples in 3D printing, in particular for determining the layer adhesion and the heat deformation resistance according to the prior art, ULTRAMID® C33 from BASF was used. The relative viscosity (ISO 307) was 3.3 (1% in 96% $H_2SO_4$), the melting point was (ISO 3146) 196° C. The low melting-point ULTRAMID® C37LC from BASF was used as the masterbatch carrier. The relative viscosity (ISO 307) was 3.59-3.81 (1% in 96% $H_2SO_4$), the melting point was (ISO 3146) 181° C.

EMA Copolymers

The ethylene methacrylates ELVALOY™ AC 12024S and ELVALOY™ AC 1224 from Dow were used as the masterbatch carrier. ELVALOY™ AC 12024S™ contains amine and/or phenol stabilizers, ELVALOY™ AC 1224 is stabilizer-free. The melt flow rate (MFR, ISO 1133) of ELVALOY™ AC 1224 is 2 g/10 min, that of ELVALOY™ AC 12024S is 20 g/10 min. The melting point (ISO 3146) of both materials is 91° C.

Additives

IRGAFOS® 168 from BASF is a hydrolytically stable phosphite having a melting range of 183-186° C. and a phosphorus content of 4.6%. The phosphite WESTON® 618F from Addivant melts at 37-46° C. and has a phosphorus content of 4.1%. IRGANOX® 1098 from BASF is a migration-stable, primary phenol antioxidant, which is used in polyamides. It has a melting range of 156-161° C.

MICROTALC® IT extra from Mondo Minerals is a hydrated magnesium silicate having the formula $Mg_3Si_4O_{10}(OH)_2$. With a grain size distribution $D_{98}$ of 6.5 μm, it is used as a nucleation agent in partially crystalline materials to favourably influence the spherulite size distribution and increase the macroscopic recrystallization temperature of the polymer melt. The cooling time in the injection moulding process required until demoulding is thus shortened.

EXAMPLE 1

3.8% N,N'-diallyl urea and 0.1% IRGAFOS® 168 were compounded on an extruder of the model ZSK-25 from Werner & Pfleiderer in ALPHALON® 33 and from this compound plates of the dimensions 100 mm×100 mm×2 mm were produced in injection moulding. Multipurpose test specimens of the type 5A (DIN EN ISO 527-2) were milled from these plates. These 5A test specimens were irradiated using beta beams of an energy of 10 MeV of a resonance accelerator of the type RHODOTRON® at 0, 33, 66, 99, 132, and 165 kGy. The tensile strength and the elongation at fracture were determined on the test specimens (DIN EN ISO 527). In addition, 0.2 mm chips were obtained from the test specimens to determine the gel content using formic acid (GA).

|  | dose [kGy] | | | | | |
| --- | --- | --- | --- | --- | --- | --- |
|  | 0 | 33 | 66 | 99 | 132 | 165 |
| gel content [%] | 0 | 0 | 37.3 | 65.1 | 67.9 | 73.2 |
| tensile strength [MPa] | 87.3 | 95.7 | 107 | 119 | 118 | 125 |
| elongation at fracture [%] | 206 | 198 | 189 | 172 | 152 | 121 |

As expected, the tensile strength and the gel content increased with increasing dose, the elongation at fracture decreased.

EXAMPLE 1A

30% N,N'-diallyl urea was compounded on an extruder of model ZSK-25 from Werner & Pfleiderer in ELVALOY™ AC 12024S (masterbatch 1). 12.7% masterbatch 1 and 0.1% IRGAFOS® 168 were compounded on a ZSK-25 from Werner & Pfleiderer in ALPHALON® 33 and from this compound plates of the dimensions 100 mm×100 mm×2 mm and rod test specimens of type B (80 mm×10 mm×4 mm, DIN EN ISO 20753) were produced in injection moulding. Multipurpose test specimens of the type 5A (DIN EN ISO 527-2) were milled from the plates, and test specimens for carrying out the dynamic thermal mechanical analysis, 80 mm×10 mm×2 mm.

The test specimens were irradiated using beta beams of an energy of 10 MeV of a resonance accelerator of the type RHODOTRON® at 0, 33, 66, 99, 132 and 165 kGy. On these test specimens, the tensile strength, the elongation at fracture, the thermal deformation resistance according to DIN EN ISO 75-2, method B (0.45 MPa), and the glass transition were determined.

In addition, 0.2 mm chips were obtained from the test specimens to determine the gel content using formic acid (GA).

|  | dose [kGy] | |
| --- | --- | --- |
|  | 0 | 33 |
| gel content [%] | 6.8 | 11.2 |
| yield stress [MPa] | 44.4 | 47.4 |
| elongation at fracture [%] | 134 | 103 |

-continued

|  | dose [kGy] | |
| --- | --- | --- |
|  | 0 | 33 |
| glass transition [° C.] | 59.5 | 67.3 |
| HDT/B [° C.] | 85.8 | 112 |

For the doses 66, 99, 132, 165 kGy, it was not possible to establish a further increase of the gel content, which is to be attributed to amine and/or phenol primary antioxidants in the ELVALOY™ AC 12024S. Since ELVALOY™ AC is insoluble in formic acid, the 0 kGy sample also contains insoluble components. The comparison of the doses 0 and 33 kGy showed a clear increase of the thermal deformation resistance.

EXAMPLE 1B

30% N,N'-diallyl urea was compounded on an extruder of model ZSK-25 from Werner & Pfleiderer in ULTRAMID® C37LC (masterbatch 2).

12.7% masterbatch 2 was compounded together with diverse additives in ALPHALON® 33. The precise composition can be taken from the following table:

| Compound | AO 168[a] [%] | AO 1098[b] [%] | AO 618F[c] [%] | MICROTALC[d] [%] | Masterbatch 2 [%] | ALPHALON[e] [%] |
| --- | --- | --- | --- | --- | --- | --- |
| C37LC_4 | — | — | — | — | 12.7 | 87.3 |
| C37LC_2 | 0.1 | — | — | — | 12.7 | 87.2 |
| C37LC_3 | 0.1 | — | — | 0.1 | 12.7 | 87.1 |
| C37LC_5 | 0.1 | 0.1 | — | 0.1 | 12.7 | 87.0 |
| C37LC_6 | — | — | 0.1 | 0.1 | 12.7 | 87.1 |

[a]IRGAFOS ® 168
[b]IRGANOX ® 1098
[c]WESTON ® 618F
[d]MICROTALC ® IT extra
[e]ALPHALON ® 33

Plates of 100 mm×100 mm×2 mm and rod test specimens of type B (80 mm×10 mm×4 mm DIN EN ISO 20753) were produced in injection moulding. Multipurpose test specimens of the type 5A (DIN EN ISO 527-2) were milled from the plates, and test specimens for carrying out the dynamic thermal mechanical analysis.

The test specimens were irradiated using beta beams of a resonance accelerator of the type RHODOTRON® at 0, 33, 66, 99, 132 and 165 kGy. On these test specimens, the tensile strength, the thermal deformation resistance according to DIN EN ISO 75-2, method B (0.45 MPa), and the glass transition were determined.

Granulated material was irradiated and the gel content was determined using benzyl alcohol (GB).

|  | dose [kGy]/tensile strength [MPa] | | | | | |
| --- | --- | --- | --- | --- | --- | --- |
| Compound | 0 | 33 | 66 | 99 | 132 | 165 |
| C37LC_4 | 52.3 | 43.8 | 42.8 | 48.1 | 48.6 | 48.9 |
| C37LC_2 | 51.5 | 42.5 | 39.8 | 47.4 | 51.6 | 50.7 |
| C37LC_3 | 50.9 | 50.8 | 51.2 | 53.6 | 53.6 | 54.8 |
| C37LC_5 | 51.7 | 47 | 46.4 | 48.6 | 51.6 | 50.2 |
| C37LC_6 | 55.4 | 49.4 | 48.2 | 51.1 | 52.8 | 53 |

The tensile strength has a drop of up to 10 MPa between 0 kGy and 33 kGy. However, this drop was compensated again at higher doses by the increasing cross-linking. The formulation C37LC_3 did not display any drop of the tensile strength.

| Compound | dose [kGy]/HDT/B [° C.] | | | | |
| --- | --- | --- | --- | --- | --- |
|  | 0 | 33 | 66 | 99 | 132 | 165 |
| C37LC_4 | 150 | 145 | 142 | 155 | 154 | 159 |
| C37LC_2 | 151 | 150 | 155 | 158 | 157 | 154 |
| C37LC_3 | 160 | 160 | 163 | 169 | 168 | 169 |
| C37LC_5 | 150 | 161 | 167 | 166 | 169 | 170 |
| C37LC_6 | 163 | 153 | 157 | 156 | 176 | 171 |

The thermal deformation resistance of the additionally stabilized formulations (C37LC_2, 3, 5) increases continuously with increasing dose.

| Compound | dose [kGy]/gel content [%] | | | | |
| --- | --- | --- | --- | --- | --- |
|  | 0 | 33 | 66 | 99 | 132 | 165 |
| C37LC_4 | 0.8 | 22.5 | 63.3 | 78.9 | 93.0 | 92.7 |
| C37LC_2 | 0 | 45.6 | 52.7 | 83.9 | 94.0 | 97.6 |
| C37LC_3 | 0 | 50.3 | 76.3 | 86.6 | 93.1 | 95.2 |

The table shows the increase of the gel content with increasing dose. The nucleated formulation C37LC_3 supplied the best values.

EXAMPLE 2

4.9% N,N'-diallyl malonamide and 0.1% IRGAFOS® 168 were compounded on an extruder of the model ZSK-25 from Werner & Pfleiderer in ALPHALON® 33 and from this compound plates of the dimensions 100 mm×100 mm×2 mm and rod test specimens of type B (80 mm×10 mm×4 mm, DIN EN ISO 20753) were produced in injection moulding. Multipurpose test specimens of the type 5A (DIN EN ISO 527-2) were milled from the plates, and test specimens for carrying out the dynamic thermal mechanical analysis, 80 mm×10 mm×2 mm.

The test specimens were irradiated using beta beams of a resonance accelerator of the type RHODOTRON® at 0, 33, 66, 99, 132, and 165 kGy. On these test specimens, the tensile strength, the elongation at fracture, and the thermal deformation resistance according to DIN EN ISO 75-2, method B (0.45 MPa) were determined.

In addition, 0.2 mm chips were obtained from the test specimens to determine the gel content using formic acid (GA).

|  | dose [kGy] | | | | | |
| --- | --- | --- | --- | --- | --- | --- |
|  | 0 | 33 | 66 | 99 | 132 | 165 |
| gel content [%] | 0 | 26.5 | 50.2 | 62.5 | 56.9 | 61.6 |
| tensile strength [MPa] | 87.9 | 108 | 120 | 124 | 134 | nd |
| elongation at fracture [%] | 186 | 207 | 89.7 | 93.5 | nd | 46.2 |

From 99 kGy, it was not possible to establish a further increase of the gel content. A further increase of the gel content was observed with determination method B at higher doses.

|  | dose [kGy] | | |
| --- | --- | --- | --- |
|  | 99 | 132 | 165 |
| gel content [%] | 79.4 | 86.0 | 92.6 |

The elongation at fracture first slightly increases with higher dose and then drops. The tensile strength increases continuously with the dose.

EXAMPLE 3

5.2% N,N'-diallyl succinamide and 0.1% IRGAFOS® 168 were compounded on an extruder of model ZSK-25 from Werner & Pfleiderer in ALPHALON® 33. The compound was irradiated using beta beams of a resonance accelerator of the type RHODOTRON® at 0, 33, 66, 99, 132, and 165 kGy and the gel content was determined using benzyl alcohol (GB).

|  | dose [kGy] | | | | | |
| --- | --- | --- | --- | --- | --- | --- |
|  | 0 | 33 | 66 | 99 | 132 | 165 |
| gel content [%] | 0 | 84.8 | 91.7 | 95.6 | 96.5 | 96.0 |

High gel contents could already be achieved in the compound at low doses.

EXAMPLE 4

3.7% N,N',N''-triallyl citric acid triamide and 0.1% IRGAFOS® 168 were compounded on an extruder of model ZSK-25 from Werner & Pfleiderer in ALPHALON® 33 and from this compound plates of 100 mm×100 mm×2 mm and rod test specimens of type B (80 mm×10 mm×4 mm, DIN EN ISO 20753) were produced in injection moulding. Multipurpose test specimens of the type 5A (DIN EN ISO 527-2) were milled from the plates.

The test specimens and granulated material samples were irradiated using beta beams of a resonance accelerator of the type RHODOTRON® at 0, 33, 66, 99, 132, and 165 kGy. On these test specimens, the tensile strength and the thermal deformation resistance were determined according to DIN EN ISO 75-2, method B (0.45 MPa).

The gel content was determined on the granulated material samples using benzyl alcohol (GB).

|  | dose [kGy] | | | | | |
| --- | --- | --- | --- | --- | --- | --- |
|  | 0 | 33 | 66 | 99 | 132 | 165 |
| yield stress [MPa] | 51 | 39.9 | 41.6 | 44.7 | 44.5 | 45.4 |
| HDT/B [° C.] | 130 | 129 | 147 | 159 | 136 | 209 |

It was possible to reach a thermal deformation resistance of 209° C.

EXAMPLE 5

In this example, the effect of beta beams of a resonance accelerator of the type RHODOTRON® on the mechanical properties of 3D-printed components was studied, which were produced in the fused filament fabrication or fused deposition modelling method (FFF, FDM®) using a FELIX™ Pro 1 from Felix Printers.

For this purpose, compounds were produced on a ZSK-25 from Werner & Pfleiderer.

Compound 1 consisted of 5.2% N,N'-diallyl succinamide, 0.1% IRGAFOS® 168, and 0.1% MICROTALC® IT extra in ALPHALON® 33.

Compound 2 consisted of 0.1% IRGAFOS® 168 and 0.1% MICROTALC® IT extra in ALPHALON® 33.

Filament 1 was produced from compound 1 and filament 2 was produced from compound 2 on a filament extrusion system. Both filaments had a diameter of 1.75 mm.

The test specimen for determining the yield stress in the layer plane (xy direction) is a horizontally printed tension rod of the type ISO 27-1 1A. The test specimen for determining the yield stress perpendicular to the layer (z direction, layer adhesion) is a tension rod of the type ISO 527-1 1A, in which the linear test section of 80 mm was shortened to 0.4 mm, and which was printed standing upright.

In each case 5 copies arranged in a cross shape were printed simultaneously of both test specimens.

The virtual models were created using the software INVENTOR™ from Autodesk and stored in the file format Surface Tessellation Language, .stl.

The .stl files were converted using the software SIMPLIFY3D™ into the .GCODE for the printer. The most important settings for printing the test specimens were a printing speed of 50 m/s, a nozzle temperature of 250° C., a layer thickness of 0.2 mm, an infill of 100%, 3 outlines. The nozzle diameter was 0.5 mm. The test specimens were each irradiated at 99 kGy:

|  | Filament 1 | Filament 2 (without irradiation) |
|---|---|---|
| Layer adhesion, yield stress, z [MPa] | 7.4 | 6 |
| yield stress xy [MPa] | 105 | 51 |

It was possible to increase the layer adhesion in the z plane by 23%. In the xy plane even by more than 100%.

EXAMPLE 6

In this example, the thermal stability of the additives was studied by means of thermogravimetric analysis (TGA). The heating rate is 10 K/min, work was performed under a nitrogen atmosphere. The values for a mass loss of 2% are indicated. In this case, the abbreviations denote: DAU is N,N'-diallyl urea, DAO is N,N'-diallyl oxalamide, DAM is N,N'-diallyl malonamide, DAM* is 2,2-diallyl malonamide, DAS is N,N'-diallyl succinamide, DAA is N,N'-diallyl adipamide, TACT is N,N',N''-triallyl citronamide, and TABT is N,N',N'',N'''-tetraallyl butane tetracarboxamide.

| Compound | | | | | | | |
|---|---|---|---|---|---|---|---|
| DAU | DAO | DAM | DAM* | DAS | DAA | TACT | TABT |
| 2% mass loss 149 | 135.5 | 183.7 | 183.7 | 186.5 | 223.4 | 229 | 275 |

Since the TGA of DAA, TACT, and TABT is higher than the melting point of polyamide 6 (220° C.), both compounds are suitable for food contact applications.

The invention claimed is:

1. A radiation crosslinking booster(s) comprising an allyl group(s) and an amide group(s) as cross-linking booster(s) in the beta or gamma radiation of aliphatic polyamides, wherein the allyl group is bonded directly to the amide group, according to the following formula:

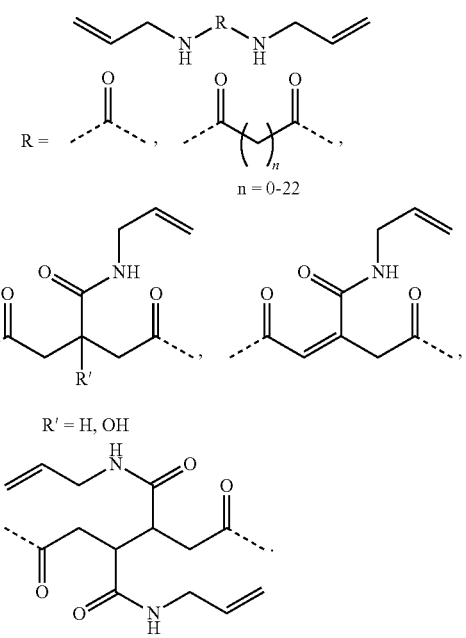

2. The radiation crosslinking booster(s) according to claim 1, wherein said radiation crosslinking boosters comprise at least two amide groups and at least two allyl groups.

3. The radiation crosslinking booster(s) according to claim 1, wherein the radiation crosslinking boosters are selected from a group consisting of amides of carbonic, oxalic, malonic, succinic, adipic, citric, and butane tetracarboxylic ac.

4. The radiation crosslinking booster(s) according to claim 1, wherein the radiation crosslinking boosters are N,N'-diallyl urea, N,N'-diallyl oxalamide, N,N'-diallyl malonamide, 2,2-diallyl malonamide, N,N'-diallyl succinamide, N,N'-diallyl adipamide, 2,5-diallyl adipamide, N,N',N''-triallyl citric acid triamide, N,N',N'',N'''-tetraallyl butane tetracarboxamide, N,N'-diallyl dodecandiamide, or N,N'-diallyl octadecandiamide.

5. The radiation crosslinking booster(s) according to claim 1, wherein the amide group and the allyl group are present spatially separated from one another, of the following general formula:

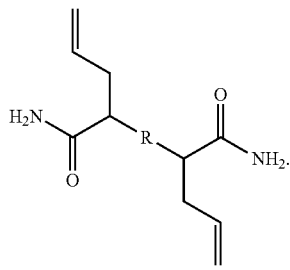

6. The radiation crosslinking booster(s) according to claim 5, wherein said cross-linking boosters are selected from the group consisting of 2,2-diallyl malonamide, 2,5-diallyl adipamide and a combination thereof.

7. The radiation crosslinking booster(s) according to claim 1, wherein said radiation cross-linking boosters are 1.0 to 11 wt. % in relation to the weight of the aliphatic polyamide.

8. The radiation crosslinking booster(s) according to claim 7, wherein said radiation cross-linking boosters are 2.0 to 6.0 wt. %, in relation to the weight of the aliphatic polyamide.

9. The radiation crosslinking booster(s) according to claim 7, wherein said radiation cross-linking boosters are 3.0 to 5.0 wt. % in relation to the weight of the aliphatic polyamide.

10. The radiation crosslinking booster(s) according to claim 1, wherein said radiation crosslinking boosters further comprise additives.

11. The radiation crosslinking booster(s) according to claim 10, wherein said additives are process stabilizers.

12. The radiation crosslinking booster(s) according to claim 11, wherein said process stabilizers are one or more of phosphites and nucleation agents.

13. The radiation crosslinking booster(s) according to claim 10, wherein said additives are present in the radiation cross-linking of polyamide 6, polyamide 66, polyamide 6/66, or polyamide 12.

14. A compound, injection molding, or 3D print comprising aliphatic polyamide(s) comprising radiation crosslinking booster(s) as claimed in claim 1.

15. The compound, injection molding or 3D print according to claim 14, wherein said aliphatic polyamide(s) is polyamide 6, polyamide 66, polyamide 6/66, or polyamide 12.

16. A method of crosslinking aliphatic polyamides comprising cross-linking aliphatic polyamides with beta or gamma radiation in the presence of cross-linking booster(s) comprising allyl group(s) and amide group(s) as claimed in claim 1.

17. The method of crosslinking aliphatic polyamides according to claim 16, wherein the allyl group is bonded directly to the amide group according to the following formula:

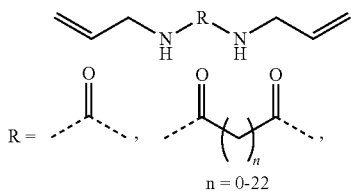

n = 0-22

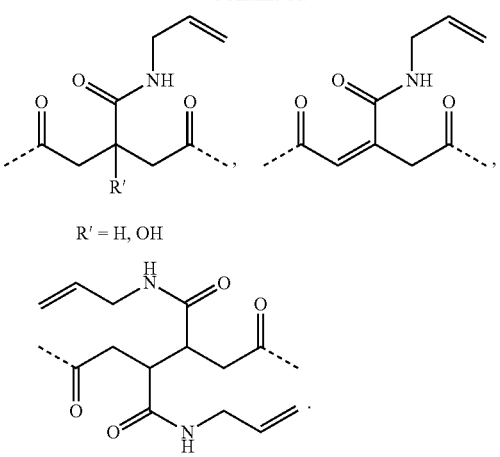

R' = H, OH

18. The method of crosslinking aliphatic polyamides according to claim 16, wherein the amide group and the allyl group are present spatially separated from one another and have the following general formula:

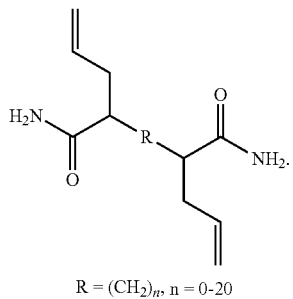

R = (CH$_2$)$_n$, n = 0-20

19. A method for producing radiation-crosslinked moulded bodies, comprising the steps of (a) admixing radiation-crosslinking boosters(s) as claimed in claim 1 with polyamide; (b) processing the admixture to form moulded bodies; and (c) treating the moulded bodies formed in step (b) with electron or gamma radiation.

20. A method for producing radiation-crosslinked moulded bodies as claimed in claim 19, wherein step (b) comprises extruding, 3D-printing or injection moulding the moulded bodies.

* * * * *